(12) United States Patent
Weismantel et al.

(10) Patent No.: US 7,947,794 B2
(45) Date of Patent: May 24, 2011

(54) POLYMERIZATION PROCESS

(75) Inventors: Matthias Weismantel, Jossgrund-Oberndorf (DE); Michael de Marco, Weinheim (DE); Andreas Daiss, Deidesheim (DE); Dominicus van Esbroeck, Nanjing (CN); Karl J. Possemiers, Gravenwezel (BE); Ronny De Kaey, Mortsel (BE); Leo Van Miert, Kapellen (BE)

(73) Assignee: BASF SE, Ludwigshafen (DE)

( * ) Notice: Subject to any disclaimer, the term of this patent is extended or adjusted under 35 U.S.C. 154(b) by 438 days.

(21) Appl. No.: 12/065,322

(22) PCT Filed: Aug. 31, 2006

(86) PCT No.: PCT/EP2006/065848
§ 371 (c)(1),
(2), (4) Date: Feb. 29, 2008

(87) PCT Pub. No.: WO2007/028750
PCT Pub. Date: Mar. 15, 2007

(65) Prior Publication Data
US 2008/0221282 A1 Sep. 11, 2008

(30) Foreign Application Priority Data
Sep. 7, 2005 (DE) .................. 10 2005 042 609

(51) Int. Cl.
*C08F 4/40* (2006.01)
*C08F 4/00* (2006.01)
*C08F 20/06* (2006.01)
*C08F 120/06* (2006.01)
*C08F 2/00* (2006.01)
*C08G 85/00* (2006.01)

(52) U.S. Cl. .......... 526/317.1; 526/62; 526/64; 526/72; 526/89; 526/328

(58) Field of Classification Search .............. 526/64, 526/62, 72, 317.1, 318, 319, 328, 89
See application file for complete search history.

(56) References Cited

U.S. PATENT DOCUMENTS

| | | | | |
|---|---|---|---|---|
| 3,316,199 | A * | 4/1967 | Murphy | 524/461 |
| 4,331,787 | A * | 5/1982 | Fairchok et al. | 523/324 |
| 6,667,372 | B1 * | 12/2003 | Miyake et al. | 526/61 |
| 6,710,141 | B1 | 3/2004 | Heide et al. | |
| 6,727,345 | B2 * | 4/2004 | Kajikawa et al. | 528/502 R |
| 6,911,499 | B1 | 6/2005 | Brehm et al. | |
| 2003/0020199 | A1 | 1/2003 | Kajikawa et al. | |
| 2004/0018365 | A1 | 1/2004 | Krautkramer et al. | |
| 2004/0204554 | A1 * | 10/2004 | Ko et al. | 526/229 |

FOREIGN PATENT DOCUMENTS

| | | |
|---|---|---|
| DE | 199 55 861 | 5/2001 |
| EP | 1 097 946 | 5/2001 |
| WO | WO-01/16197 | 3/2001 |
| WO | WO-01/38402 | 5/2001 |
| WO | WO-03/004237 | 1/2003 |
| WO | WO-03/022896 | 3/2003 |

OTHER PUBLICATIONS

Chemical Abstracts + Indexes, American Chemical Society. Columbus, US, Nov. 15, 1993, XP000407497 ISSN: 0009-2258 abstract.
International Search Report in PCT/EP2006/065848 dated Dec. 12, 2006.
Ullmann et al., *Ullmann's Encyclopedia of Industrial Chemistry*, 6th ed., vol. 35, pp. 1-21, New York: Wiley, 2005.

* cited by examiner

*Primary Examiner* — Vasu Jagannathan
*Assistant Examiner* — Karuna P Reddy
(74) *Attorney, Agent, or Firm* — Marshall, Gerstein & Borun LLP

(57) ABSTRACT

The invention relates to a process for continuously preparing water-absorbing polymer particles by mixing a monomer solution with a redox initiator consisting of at least one oxidizing agent and at least one reducing agent and polymerizing it, wherein the monomer solution is mixed with at least one oxidizing agent upstream of the polymerization reactor and the at least one reducing agent is metered into the polymerization reactor, and also to an apparatus for performing the process.

9 Claims, 1 Drawing Sheet

POLYMERIZATION PROCESS

CROSS-REFERENCE TO RELATED APPLICATIONS

Figure 1:
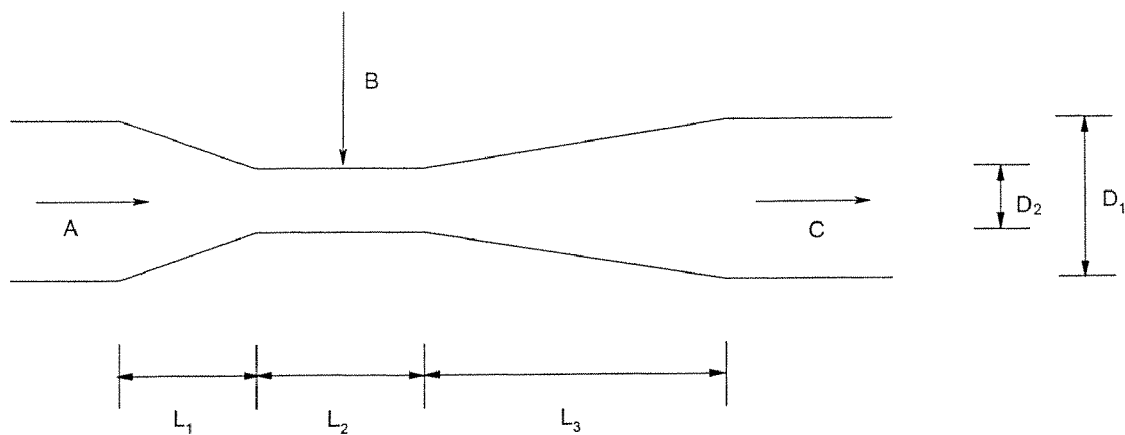

This is the U.S. national phase application of International Application No. PCT/EP2006/065848, filed Aug. 31, 2006, which claims the benefit of German patent application No. 10 2005 042 609.3, filed Sep. 7, 2005.

DESCRIPTION

The present invention relates to a process for continuously preparing water-absorbing polymer particles by mixing a monomer solution with a redox initiator consisting of at least one oxidizing agent and at least one reducing agent and polymerizing it, wherein the monomer solution is mixed with at least one oxidizing agent upstream of the polymerization reactor and the at least one reducing agent is metered into the polymerization reactor, and also to an apparatus for performing the process.

Further embodiments of the present invention can be taken from the claims, the description and the examples. It is evident that the features of the inventive subject matter which have been mentioned above and will be explained below are usable not only in the combination specified in each case but also in other combinations without leaving the scope of the invention.

Water-absorbing polymers are especially polymers of (co)polymerized hydrophilic monomers, graft (co)polymers of one or more hydrophilic monomers on a suitable graft base, crosslinked cellulose ethers or starch ethers, crosslinked carboxymethylcellulose, partly crosslinked polyalkylene oxide or natural products swellable in aqueous liquids, for example guar derivatives, preference being given to water-absorbing polymers based on partly neutralized acrylic acid. Such polymers are used as products that absorb aqueous solutions to produce diapers, tampons, sanitary napkins and other hygiene articles, but also as water-retaining agents in market gardening.

The preparation of the water-absorbing polymers is described, for example, in the monograph "Modern Superabsorbent Polymer Technology", F. L. Buchholz and A. T. Graham, Wiley-VCH, 1998, or in Ullmann's Encyclopedia of Industrial Chemistry, 6th Edition, Volume 35, pages 73 to 103. The preferred preparation process is solution or gel polymerization. In this technology, a monomer solution is firstly prepared and is neutralized batchwise and then transferred to a polymerization reactor, or initially charged actually within the polymerization reactor. In the batchwise or continuous process which follows, the reaction is effected to give the polymer gel which, in the case of a stirred polymerization, is already in comminuted form. The polymer gel is subsequently dried, ground and sieved and then transferred to further surface treatment.

A continuous polymerization process forms the basis, for example, of WO-A-01/38402, in which the aqueous monomer solution, together with the initiator and the inert gas, is fed continuously to a mixing kneader with at least two axially parallel-rotating shafts.

Continuous gel polymerizations are also known from WO-A-03/004237, WO-A-03/022896 and WO-A-01/016197.

Frequently, the polymerizations are initiated by redox initiators, as described in DE-A-199 55 861, EP-A-1 097 946 and WO-A-03/022896.

According to DE-A-199 55 861, for example, sodium peroxodisulfate, hydrogen peroxide and ascorbic acid are metered into a continuous kneader together with the monomer solution via separate lines.

EP-A-1 097 946 discloses the use of sodium persulfate, hydrogen peroxide and ascorbic acid as redox initiators, the initiator components being added to the monomer solution in succession upstream of the belt reactor.

WO-A-03/022896 describes the use of sodium persulfate and ascorbic acid as redox initiators. The monomer solution is premixed with sodium persulfate and admixed with ascorbic acid immediately upstream of the kneader (polymerization reactor).

It was an object of the present invention to provide an improved process for preparing water-absorbing polymers, in which the initiator system is mixed optimally into the monomer solution and the risk of premature polymerization is reduced.

It was a further object of the present invention to provide an improved polymerization process for preparing crosslinked polymers, in which the monomer conversion should be at a maximum and the proportion of uncrosslinked polymers at a minimum.

The object is achieved by a process for continuously preparing water-absorbing polymer particles by mixing a monomer solution with a redox initiator consisting of at least one oxidizing agent and at least one reducing agent and polymerizing it, which comprises mixing the monomer solution with at least one oxidizing agent upstream of the polymerization reactor and metering the at least one reducing agent into the polymerization reactor.

The oxidizing agents used may be any compounds which decompose into free radicals under the polymerization conditions, for example peroxides, hydroperoxides, hydrogen peroxide and persulfates. Preference is given to using water-soluble initiators. In some cases, it is advantageous to use mixtures of different initiators, for example mixtures of hydrogen peroxide and sodium peroxodisulfate or potassium peroxodisulfate. Mixtures of hydrogen peroxide and sodium peroxodisulfate can be used in any desired ratio.

Suitable organic peroxides are, for example, acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl) peroxydicarbonate, dicyclohexyl peroxydicarbonate, di(4-tert-butylcyclohexyl) peroxydicarbonate, dimyristyl peroxydicarbonate, diacetyl peroxydicarbonate, allyl perester, cumyl peroxyneodecanoate, tert-butyl per-3,5,5-trimethylhexanoate, acetylcyclohexylsulfonyl peroxide, dilauryl peroxide, dibenzoyl peroxide and tert-amyl perneodecanoate.

Preference is given to using at least two oxidizing agents. The at least two oxidizing agents are preferably premixed, i.e. metered into the monomer solution as a mixture.

Suitable reducing agents are, for example, ascorbic acid, glucose, sorbose, the hydrogen sulfite, sulfite, thiosulfate, hyposulfite, pyrosulfite or sulfide salts of ammonium or alkali metals, or sodium hydroxymethylsulfoxylate. The reducing component used in the redox initiator is preferably ascorbic acid or sodium pyrosulfite.

In addition, it is also possible to use further initiators, for example azo initiators.

The viscosity of the monomer solution at 15° C. is preferably from 5 to 200 mPas, more preferably from 10 to 100 mPas, most preferably from 20 to 50 mPas, the viscosity being measured with a Brookfield viscometer (spindle 2, 100 rpm).

The monomer concentration in the monomer solution is preferably from 10 to 80% by weight, more preferably from 20 to 60% by weight, most preferably from 30 to 50% by weight.

The monomer solution comprises at least one ethylenically unsaturated monomer, preferably acrylic acid and/or salts thereof. The proportion of acrylic acid and/or salts thereof in the total amount of monomer is preferably at least 50 mol %, more preferably at least 90 mol %, most preferably at least 95 mol %.

In a preferred embodiment of the present invention, the at least one oxidizing agent is metered in via a Venturi tube.

A Venturi tube is a tube constriction of restricted length, in which the pressure drop is converted substantially reversibly to kinetic energy. To this end, the cross-sectional area $F_1$ is reduced to the cross section $F_2$ over the distance $L_1$ (narrowing zone), the cross-sectional area $F_2$ is kept constant over the distance $L_2$ (constriction zone) and the cross-sectional area $F_2$ is widened again to the cross-sectional area $F_1$ over the distance $L_3$ (diffuser). The cross-sectional area $F_1$ is greater than the cross-sectional area $F_2$ and the length $L_3$ greater than the length $L_1$.

The oxidizing agent is preferably metered in the region of the zone $L_1$ or of the zone $L_2$.

FIG. 1 shows a typical Venturi tube, the reference symbols being defined as follows:

| | |
|---|---|
| A: | monomer solution before metering of oxidizing agent |
| B: | oxidizing agent feed |
| C: | monomer solution comprising oxidizing agent |
| $L_1$: | narrowing zone |
| $L_2$: | constriction zone |
| $L_3$: | diffuser |
| $D_1$: | diameter of the pipeline |
| $D_2$: | diameter of the constriction zone |

The optimal design of a Venturi tube is known per se to those skilled in the art. The Venturi tube is preferably designed such that the pressure in the region of the zone $L_2$ is less than the ambient pressure (suction conveying) and/or that the flow in the region of the zone $L_2$ is turbulent, in which case the Reynolds number should be at least 1000, preferably at least 2000, more preferably at least 3000, most preferably at least 4000, and typically less than 10 000 000.

The at least one oxidizing agent can be metered in via one or more addition points.

For example, the oxidizing agent may be metered in via two, three, four, five or six addition points, the addition points preferably being arranged such that they have a common axis (for two addition points) or form a symmetrical star (for at least three addition points), and the axis or star is at right angles to the flow direction of the monomer solution (multiple addition points).

The division into a plurality of addition points brings about more uniform mixing.

When a plurality of oxidizing agents are used, they may be metered in separately or as a mixture, preferably as a mixture.

The residence time of the mixture between the addition point of the at least one oxidizing agent and the polymerization reactor is preferably less than 20 seconds, preferentially less than 15 seconds, more preferably less than 10 seconds, most preferably less than 5 seconds. A very particularly advantageous residence time is in the range from 0.1 to 1 second.

The at least one reducing agent is metered into the polymerization reactor such that the reducing agent cannot come into contact with the monomer solution until within the polymerization reactor, preferably at least 5 cm, preferentially at least 10 cm, more preferably at least 20 cm, most preferably at least 50 cm, away from the point at which the monomer solution enters the polymerization reactor.

Figure 2:
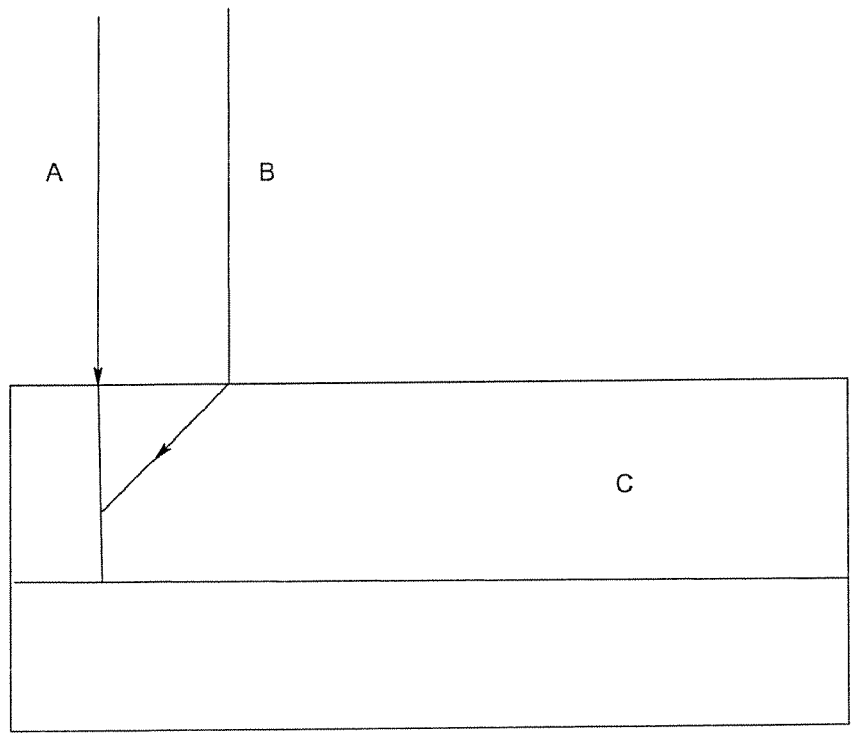

In a preferred embodiment of the present invention, monomer solution and reducing agent are metered into the polymerization reactor such that the liquid streams mix, at the latest, at the height which corresponds to the fill level of the polymerization reactor. FIG. 2 shows an example of this preferred embodiment, in which the reference symbols are defined as follows:

| | |
|---|---|
| A: | inlet for monomer solution comprising oxidizing agent |
| B: | inlet for reducing agent |
| C: | polymerization reactor |

The polymerization tendency can be reduced when the connection between oxidizing agent metering and polymerization reactor at least partly, preferably at least to an extent of at least 50% of the surface, more preferably as fully as possible in construction terms, has a material surface which has a content angle for water of at least 60°, preferably at least 900, more preferably at least 100°.

The contact angle is a measure of the wetting behavior and can be measured by customary methods, preferably according to DIN 53900.

Suitable materials with corresponding wetting behavior are polyethylene, polypropylene, polyester, polyamide, polytetrafluorethylene, polyvinyl chloride, epoxy resins and silicone resins. Very particular preference is given to polypropylene.

Preference is given to mixing a preneutralized monomer solution with the at least one crosslinker, inertizing the mixture, mixing the inertized mixture with at least one oxidizing agent and polymerizing.

The water-absorbing polymers are obtained, for example, by polymerization of a monomer solution comprising
a) at least one ethylenically unsaturated acid-functional monomer,
b) at least one crosslinker,
c) if appropriate one or more ethylenically and/or allylically unsaturated monomers copolymerizable with the monomer a), and
d) if appropriate one or more water-soluble polymers onto which the monomers a), b) and if appropriate c) can be at least partly grafted.

Suitable monomers a) are, for example, ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Particularly preferred monomers are acrylic acid and methacrylic acid. Very particular preference is given to acrylic acid.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol refers to compounds of the following formula:

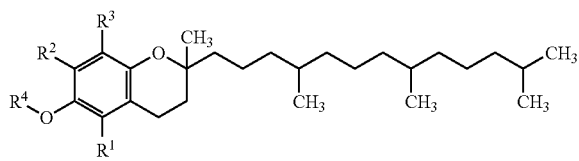

where $R^1$ is hydrogen or methyl, $R^2$ is hydrogen or methyl, $R^3$ is hydrogen or methyl and $R^4$ is hydrogen or an acyl radical having from 1 to 20 carbon atoms.

Preferred $R^4$ radicals are acetyl, ascorbyl, succinyl, nicotinyl and other physiologically tolerable carboxylic acids. The carboxylic acids may be mono-, di- or tricarboxylic acids.

Preference is given to alpha-tocopherol where $R^1=R^2=R^3=$methyl, especially racemic alpha-tocopherol. $R^1$ is more preferably hydrogen or acetyl. Especially preferred is RRR-alpha-tocopherol.

The monomer solution comprises preferably not more than 130 ppm by weight, more preferably not more than 70 ppm by weight, preferably not less than 10 ppm by weight, more preferably not less than 30 ppm by weight and especially about 50 ppm by weight of hydroquinone monoether, based in each case on acrylic acid, with acrylic acid salts being counted as acrylic acid. For example, the monomer solution can be prepared using acrylic acid having an appropriate hydroquinone monoether content.

The crosslinkers b) are compounds having at least two polymerizable groups which can be free-radically polymerized into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP-A-0 530 438, di- and triacrylates, as described in EP-A-0 547 847, EP-A-0 559 476, EP-A-0 632 068, WO-A-93/21237, WO-A-03/104299, WO-A-03/104300, WO-A-03/104301 and DE-A-103 31 450, mixed acrylates which, as well as acrylate groups, comprise further ethylenically unsaturated groups, as described in DE-A-103 31 456 and WO-A-04/013064, or crosslinker mixtures as described, for example, in DE-A-1 95 43 368, DE-A-196 46 484, WO-A-90/15830 and WO-A-02/32962.

Suitable crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described, for example, in EP-A-0 343 427. Suitable crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. In the process of the invention, it is possible to use di(meth)acrylates of polyethylene glycols, the polyethylene glycol used having a molecular weight between 300 and 1000.

However, particularly advantageous crosslinkers b) are di- and triacrylates of 3- to 15-tuply ethoxylated glycerol, of 3- to 15-tuply ethoxylated trimethylolpropane, of 3- to 15-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol, of 3-tuply mixed ethoxylated or propoxylated trimethylolpropane, of 15-tuply ethoxylated glycerol or of 15-tuply ethoxylated trimethylolpropane, and of 40-tuply ethoxylated glycerol, of 40-tuply ethoxylated trimethylolethane and also of 40-tuply ethoxylated trimethylolpropane.

Very particularly preferred crosslinkers b) are polyethoxylated and/or -propoxylated glycerols which have been esterified with acrylic acid or methacrylic acid to di- or triacrylates, as described, for example, in WO-A-03/104301. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 ppm by weight) in the water-absorbing polymer and the aqueous extracts of the water-absorbing polymers produced therewith have an almost unchanged surface tension (typically not less than 0.068 N/m) compared with water at the same temperature.

The amount of crosslinker b) is preferably from 0.01 to 1% by weight, more preferably from 0.05 to 0.5% by weight, most preferably from 0.1 to 0.3% by weight, based in each case on the monomer a).

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

For optimal action, the preferred polymerization inhibitors require dissolved oxygen. Typically, the monomer solutions are substantially freed of oxygen before the polymerization (inertization), for example by means of flowing an inert gas, preferably nitrogen, through them. This distinctly weakens the action of the polymerization inhibitors. The oxygen content of the monomer solution is preferably lowered to less than 1 ppm by weight and more preferably to less than 0.5 ppm by weight before the polymerization.

The preparation of a suitable base polymer and also further suitable hydrophilic ethylenically unsaturated monomers d) are described in DE-A-1 99 41 423, EP-A-0 686 650, WO-A-01/45758 and WO-A-03/104300.

Water-absorbing polymers are typically obtained by addition polymerization of an aqueous monomer solution and, if desired, subsequent comminution of the hydrogel. Suitable preparation methods are described in the literature. Water-absorbing polymers are obtainable, for example, by gel polymerization in the batch process or tubular reactor and subsequent comminution in meat grinder, extruder or kneader (EP-A-0 445 619, DE-A-19 846 413)

addition polymerization in kneader with continuous comminution by contrarotatory stirring shafts for example (WO-A-01/38402)

addition polymerization on belt and subsequent comminution in meat grinder, extruder or kneader (DE-A-38 25 366, U.S. Pat. No. 6,241,928)

emulsion polymerization, which produces bead polymers having a relatively narrow gel size distribution (EP-A-0 457 660)

in situ addition polymerization of a woven fabric layer which, usually in a continuous operation, has previously been sprayed with aqueous monomer solution and subsequently been subjected to a photopolymerization (WO-A-02/94328, WO-A-02/94329).

The reaction is preferably carried out in a kneader, as described, for example, in WO-A-01/38402, or on a belt reactor, as described, for example, in EP-A-0 955 086.

Neutralization can also be carried out partly after the polymerization, at the hydrogel stage. It is therefore also possible to neutralize up to 40 mol %, preferably from 10 to 30 mol % and more preferably from 15 to 25 mol % of the acid groups before the polymerization by adding a portion of the neutralizing agent to the monomer solution and setting the desired final degree of neutralization only after the polymerization, at the hydrogel stage. The monomer solution can be neutralized by mixing in the neutralizing agent. The hydrogel may be comminuted mechanically, for example by means of a meat grinder, in which case the neutralizing agent can be sprayed, sprinkled or poured on and then carefully mixed in. To this end, the gel mass obtained can be repeatedly ground in the meat grinder for homogenization. Neutralization of the monomer solution to the final degree of neutralization is preferred.

The neutralized hydrogel is then dried with a belt or drum dryer until the residual moisture content is preferably below 15% by weight and especially below 10% by weight, the water content being determined by EDANA (European Disposables and Nonwovens Association) recommended test method No. 430.2-02 "Moisture content". If desired, drying can also be carried out using a fluidized bed dryer or a heated plowshare mixer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids context of the gel, the simpler the drying, by its nature, and the whiter the product. The solids content of the gel before the drying is therefore preferably between 30% and 80% by weight. It is particularly advantageous to vent the dryer with nitrogen or another nonoxidizing inert gas. If desired, however, it is possible simply just to lower the partial pressure of the oxygen during the drying in order to prevent oxidative yellowing processes. In general, though, adequate venting and removal of the water vapor also still lead to an acceptable product. A very short drying time is generally advantageous with regard to color and product quality.

The dried hydrogel is preferably ground and sieved, useful grinding apparatus typically including roll mills, pin mills or swing mills. The particle size of the sieved, dry hydrogel is preferably below 1000 µm, more preferably below 900 µm and most preferably below 800 µm, and preferably above 100 µm, more preferably above 150 µm and most preferably above 200 µm.

Very particular preference is given to a particle size (sieve cut) of from 106 to 850 µm.

The particle size is determined according to EDANA (European Disposables and Nonwovens Association) recommended test method No. 420.2-02 "Particle size distribution".

The base polymers are then preferably surface postcrosslinked. Postcrosslinkers suitable for this purpose are compounds comprising two or more groups capable of forming covalent bonds with the carboxylate groups of the hydrogel. Suitable compounds are, for example, alkoxysilyl compounds, polyaziridines, polyamines, polyamidoamines, di- or polyglycidyl compounds, as described in EP-A-0 083 022, EP-A-543 303 and EP-A-937 736, di- or polyfunctional alcohols, as described in DE-C-33 14 019, DE-C-35 23 617 and EP-A-450 922, or β-hydroxyalkylamides, as described in DE-A-102 04 938 and U.S. Pat. No. 6,239,230.

In addition, DE-A-40 20 780 describes cyclic carbonates, DE-A-198 07 502 2-oxazolidone and its derivatives, such as 2-hydroxyethyl-2-oxazolidone, DE-A-198 07 992 bis- and poly-2-oxazolidinones, DE-A-198 54 573 2-oxotetrahydro-1,3-oxazine and its derivatives, DE-A-198 54 574 N-acyl-2-oxazolidones, DE-A-102 04 937 cyclic ureas, DE-A-103 34 584 bicyclic amide acetals, EP-A-1 199 327 oxetanes and cyclic ureas and WO-A-03/031482 morpholine-2,3-dione and its derivatives, as suitable surface postcrosslinkers.

The postcrosslinking is typically carried out in such a way that a solution of the surface postcrosslinker is sprayed onto the hydrogel or onto the dry base polymer powder. After the spraying, the polymer powder is dried thermally, and the crosslinking reaction may take place either before or during drying.

The spraying with a solution of the crosslinker will preferably be carried out in mixers having moving mixing implements, such as screw mixers, paddle mixers, disk mixers, plowshare mixers and shovel mixers. Particular preference is given to vertical mixers and very particular preference to plowshare mixers and shovel mixers. Suitable mixers are, for example, Lödige® mixers, Bepex® mixers, Nauta® mixers, Processall® mixers and Schugi® mixers.

The thermal drying is preferably carried out in contact dryers, more preferably shovel dryers and most preferably disk dryers. Suitable dryers are, for example, Bepex® dryers and Nara® dryers. It is also possible to use fluidized bed dryers.

The drying can be effected in the mixer itself, by heating the jacket or blowing in warm air. It is equally possible to use a downstream dryer, for example a tray dryer, a rotary tube oven or a heatable screw. It is also possible, for example, to utilize an azeotropic distillation as a drying process.

Preferred drying temperatures are in the range from 50 to 250° C., preferably in the range from 50 to 200° C. and more preferably in the range from 50 to 150° C. The preferred residence time at this temperature in the reaction mixer or dryer is below 30 minutes and more preferably below 10 minutes.

The process according to the invention enables the economically viable continuous preparation of water-absorbing polymer particles. The polymerization process is relatively reliable. The proportion of unconverted monomer and of uncrosslinked polymers is particularly low.

The present invention further provides an apparatus for carrying out the process according to the invention, comprising i) a polymerization reactor,
ii) a first inlet to the polymerization reactor i),
iii) at least one inlet into the first inlet ii),
iv) a second inlet to the polymerization reactor i) and
v) a device for comminuting a polymer gel,
where the extended axis of the first inlet ii) intersects the extended axis of the second inlet iv) in the polymerization reactor i).

The polymerization reactor is preferably a continuous kneader or a belt reactor.

In a kneader, the polymer gel which forms is comminuted by the stirrer shafts actually within the reactor. In a belt reactor, the polymer gel which forms has to be comminuted after leaving the belt reactor, for example in a kneader, an extruder or similar units.

Advantageously, the inner surface of the inlet ii) between polymerization reactor i) and inlet iii) at least partly has a contact angle for water of at least 60°, preferably at least 90°, more preferably at least 100°.

The contact angle is a measure of the wetting behavior and can be determined by customary methods, preferably according to DIN 53900.

Suitable materials with corresponding wetting behavior are polyethylene, polypropylene, polyester, polyamide, polytetrafluoroethylene, polyvinyl chloride, epoxy resins and silicone resins. Very particular preference is given to polypropylene.

The length of the inlet ii) between polymerization reactor i) and inlet iii) is preferably from 0.01 to 2 m, most preferably from 0.05 to 1 m, most preferably from 0.1 to 0.5 m. The cross-sectional area of the inlet ii) is preferably from 1 to 200 cm², more preferably from 5 to 100 cm², most preferably from 10 to 50 cm². The inlet ii) preferably has a circular cross section.

Preferably at least two inlets iii) are present, more preferably two, three, four, five or six inlets iii), the inlets iii) preferably being arranged such that they have a common axis (for two inlets) or form a symmetrical star (for at least three inlets), and the axis or star is at right angles to the flow direction of the monomer solution (multiple addition points).

Particularly advantageously, two, three or four multiple addition points are arranged in succession.

For example, at least eight inlets iii) may be present, in which case four inlets iii) in each case in a cross shape open into the monomer line, the at least 2 groups of four inlets iii) being arranged in succession and offset relative to one another.

In a preferred embodiment, the inlets iii) are arranged such that the angle between the inlet ii) and the inlet iii) in flow direction is less than 90°. The angle is preferably from 10 to 80°, more preferably from 20 to 70°, most preferably from 30 to 60°.

In a preferred embodiment of the present invention, the first inlet ii) is designed as a Venturi tube at the opening of the inlet iii).

The apparatus is preferably free of dead spaces and the surfaces should have minimum roughness.

Dead spaces are sections of the apparatus in which the average residence time is increased in the course of operation as intended.

The inventive apparatus is outstandingly suitable for redox polymerization.
Methods:
The measurements should, unless stated otherwise, be carried out at an ambient temperature of 23±2° C. and relative humidity of 50±10%. The water-absorbing polymers are mixed thoroughly before the measurement.
Residual Monomers
The level of residual monomer of the water-absorbing polymer particles is determined in accordance with EDANA (European Disposables and Nonwovens Association) recommended test method No. 410.2-02 "Residual monomers" by means of HPLC.
Extractables
The content of extractables in the water-absorbing polymer particles is determined in accordance with EDANA (European Disposables and Nonwovens Association) recommended test method No. 470.2-02 "Extractables".

The EDANA test methods are obtainable, for example, from the European Disposables and Nonwovens Association, Avenue Eugène Plasky 157, B-1030 Brussels, Belgium.

EXAMPLES

Example 1

Continuous mixing of water, 50% by weight sodium hydroxide solution and acrylic acid prepared a 38.8% by weight acrylic acid/sodium acrylate solution with a degree of neutralization of 71.3 mol %. As the components were mixed, the monomer solution was cooled to a temperature of 29° C. continuously by a heat exchanger.

The polyethylenically unsaturated crosslinker used was polyethylene glycol diacrylates (diacrylate of a polyethylene glycol having a mean molar mass of 400 g/mol). The amount used was 2 kg per t of monomer solution.

After the crosslinker, sodium peroxodisulfate was metered into the monomer solution. The amount used per t of monomer solution was 3.1 kg of 15% by weight aqueous sodium peroxodisulfate.

The throughput of the monomer solution was 18 t/h.

The monomer solution, hydrogen peroxide and ascorbic acid were metered continuously into a List Contiknet reactor (from List, Arisdorf, Switzerland). The pressure in the reactor was increased by 10 mbar relative to the environment. The amount of 0.25% by weight hydrogen peroxide used was 1.0 kg per t of monomer solution. The amount of 1% by weight ascorbic acid used was 1.1 kg per t of monomer solution.

Upstream of the feed, the reaction solution was degassed with nitrogen and had a temperature of 23.5° C. at the feed. The reactor was operated with a rotational speed of the shafts of 38 rpm. The residence time of the reaction mixture in the reactor was 15 minutes.

The polymerization proceeded without disruption.

After polymerization had ended and gel comminution, the polymer gel was placed onto a belt dryer. During the drying, a pressure reduced by 5 mbar relative to ambient pressure was set. The precomminuted polymer gel was placed onto the belt dryer with a layer thickness of 10 cm and dried with warm air (175° C.). The residence time in the belt dryer was 37 minutes.

The resulting polymer powder was ground and sieved (100 to 800 μm).

The polymer powder was analyzed. The results are summarized in Table 1.

Example 2

The procedure of Example 1 was repeated. Sodium peroxodisulfate and hydrogen peroxide were metered separately into the monomer solution upstream of the polymerization reactor.

The polymerization proceeded without disruption.

The polymer powder was analyzed. The results are compiled in Table 1.

Example 3

The procedure of Example 1 was repeated. Sodium peroxodisulfate, hydrogen peroxide and ascorbic acid were metered separately into the monomer solution via a Venturi tube at the reactor inlet.

To meter in the crosslinker, a 68.4 cm-long Venturi tube was used (FIG. 1), in which the pipeline narrowed from a diameter of 5 cm to 2.5 cm over a distance of 6.2 cm (zone $L_1$), retained the diameter of 2.5 cm over a distance of 20.3 cm (zone L$_2$) and widened again from a diameter of 2.5 cm to 5 cm over a distance of 41.9 cm (zone L$_3$).

Sodium peroxodisulfate, hydrogen peroxide and ascorbic acid were metered into the constriction zone of the Venturi tube in succession via two addition points opposite one another in each case.

Occasionally, the monomer solution polymerized actually within the Venturi tube.

The polymer powder was analyzed. The results are compiled in Table 1.

Example 4

The procedure of Example 3 was repeated. Sodium peroxodisulfate and hydrogen peroxide were premixed.

Occasionally, the monomer solution polymerized actually within the Venturi tube.

The polymer powder was analyzed. The results are compiled in Table 1.

Example 5

The procedure of Example 3 was repeated. Sodium peroxodisulfate and hydrogen peroxide were premixed. Ascorbic acid was metered into the polymerization reactor in parallel to the monomer solution.

The polymerization proceeded without disruption.

The polymer powder was analyzed. The results are compiled in Table 1.

TABLE 1

Metering sequence of the initiators

| Example | NaPS | H$_2$O$_2$ | ACA | Extractables | Residual monomer |
|---|---|---|---|---|---|
| 1 | A | B | B | 18.4% by wt. | 0.041% by wt. |
| 2 | A | A | B | 15.9% by wt. | 0.036% by wt. |
| 3*) | D | D | D | 11.0% by wt. | 0.029% by wt. |
| 4*) | C | C | D | 10.5% by wt. | 0.025% by wt. |
| 5 | C | C | B | 10.6% by wt. | 0.026% by wt. |

NaPS: sodium peroxodisulfate
H$_2$O$_2$: hydrogen peroxide
ACA: ascorbic acid
*)polymerization
A: separate metering into monomer solution
B: separate metering into reactor
C: joint metering into Venturi tube
D: separate metering into Venturi tube The results show that polymers having a low level of residual monomer and extractables are obtained when the oxidizing agent is mixed in upstream of the polymerization reactor and the reducing agent is not added until within the polymerization reactor. Irrespective of this, the content of residual monomer and extractables is reduced when a Venturi tube is used as a mixing unit.

What is claimed is:

1. A process for continuously preparing water-absorbing polymer particles by mixing a monomer solution with a redox initiator comprising at least one oxidizing agent and at least one reducing agent and polymerizing the monomer solution to a hydrogel, which comprises mixing the monomer solution with the at least one oxidizing agent upstream of a polymerization reactor, metering the at least one reducing agent free of monomer solution into the polymerization reactor, and comminuting the hydrogel wherein a residence time of the monomer solution between a point at which the oxidizing agent is fed and the polymerization reactor is from 0.1 to 20 seconds.

2. The process according to claim 1, wherein the monomer solution and the reducing agent are metered into the polymerization reactor such that the monomer solution and the reducing agent mix, at the latest, at a height which corresponds to a fill level of the polymerization reactor.

3. The process according to claim 1, wherein at least two oxidizing agents are used.

4. The process according to claim 3, wherein the at least two oxidizing agents are premixed.

5. The process according to claim 1, wherein an inner surface of the connection between an oxidizing agent feed and the polymerization reactor at least partly has a contact angle for water of at least 60°.

6. The process according to claim 1, wherein the at least one oxidizing agent is metered into the monomer solution via a Venturi tube.

7. The process according to claim 1, wherein at least 50 mol % of the monomers of the monomer solution are acrylic acid and/or salts thereof.

8. The process according to claim 1, wherein the monomer solution in the polymerization reactor is polymerized to a hydrogel, dried, ground, and classified.

9. The process according to claim 8, wherein the classified polymer particles are surface postcrosslinked.

* * * * *